(12) United States Patent
Kishi et al.

(10) Patent No.: US 11,050,776 B2
(45) Date of Patent: Jun. 29, 2021

(54) SECURITY MEASURE INVALIDATION PREVENTION DEVICE, SECURITY MEASURE INVALIDATION PREVENTION METHOD, AND SECURITY MEASURE INVALIDATION PREVENTION PROGRAM

(71) Applicant: NIPPON TELEGRAPH AND TELEPHONE CORPORATION, Chiyoda-ku (JP)

(72) Inventors: Toshiharu Kishi, Tokyo (JP); Yasuhiro Teramoto, Tokyo (JP); Bo Hu, Tokyo (JP); Yukio Nagafuchi, Tokyo (JP); Takaaki Koyama, Tokyo (JP); Hideo Kitazume, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 97 days.

(21) Appl. No.: 15/554,380

(22) PCT Filed: Feb. 29, 2016

(86) PCT No.: PCT/JP2016/056108
§ 371 (c)(1),
(2) Date: Aug. 29, 2017

(87) PCT Pub. No.: WO2016/140198
PCT Pub. Date: Sep. 9, 2016

(65) Prior Publication Data
US 2018/0041535 A1  Feb. 8, 2018

(30) Foreign Application Priority Data

Mar. 4, 2015  (JP) .............................. JP2015-042377

(51) Int. Cl.
*H04L 29/06* (2006.01)
*G06F 21/57* (2013.01)
(Continued)

(52) U.S. Cl.
CPC .......... *H04L 63/1433* (2013.01); *G06F 21/57* (2013.01); *H04L 63/0218* (2013.01);
(Continued)

(58) Field of Classification Search
CPC ............. H04L 63/1433; H04L 63/0218; H04L 63/1441; H04L 63/20; H04L 49/70;
(Continued)

(56) References Cited

U.S. PATENT DOCUMENTS 6,957,348 B1 * 10/2005 Flowers ................ G06F 21/552
370/229
9,130,980 B2 * 9/2015 Law .................... H04L 63/0227
(Continued)

FOREIGN PATENT DOCUMENTS

| CN | 101360053 A | 2/2009 |
|---|---|---|
| JP | 4469910 B1 | 6/2010 |
| JP | 2012-208863 A | 10/2012 |

OTHER PUBLICATIONS

International Search Report dated May 17, 2016, in PCT/JP2016/056108 filed Feb. 29, 2016.
(Continued)

*Primary Examiner* — Jahangir Kabir
(74) *Attorney, Agent, or Firm* — Oblon, McClelland, Maier & Neustadt, L.L.P.

(57) ABSTRACT

A security measure invalidation prevention device includes an acquisition unit that acquires invalidated security point information about an invalidated security point among security points each having a measure function performing a security measure on a node connected to a network. The
(Continued)

invalidated security point has a measure function to be invalidated. The device also includes a determination unit that determines whether a security event to be addressed with the measure function of the invalidated security point is present on the basis of the invalidated security point information acquired by the acquisition unit. The device further includes an extraction unit that extracts a security point to which the measure function of the invalidated security point can be shifted when the determination unit determines that the security event is present.

16 Claims, 11 Drawing Sheets

(51) Int. Cl.
    *H04L 29/08*     (2006.01)
    *H04L 12/931*     (2013.01)

(52) U.S. Cl.
    CPC .......... *H04L 63/1441* (2013.01); *H04L 63/20* (2013.01); *H04L 49/70* (2013.01); *H04L 63/0236* (2013.01); *H04L 63/145* (2013.01); *H04L 63/1416* (2013.01); *H04L 63/1458* (2013.01); *H04L 63/1466* (2013.01); *H04L 67/02* (2013.01)

(58) Field of Classification Search
    CPC ............. H04L 63/0236; H04L 63/1416; H04L 63/145; H04L 63/1458; H04L 63/1466; H04L 67/02; G06F 21/57
    USPC .............................................................. 726/1
    See application file for complete search history.

(56) References Cited

U.S. PATENT DOCUMENTS

| | | | |
|---|---|---|---|
| 2005/0108568 A1* | 5/2005 | Bussiere ............. | H04L 63/1408 726/4 |
| 2009/0044265 A1 | 2/2009 | Ghosh et al. | |
| 2011/0030049 A1 | 2/2011 | Adams et al. | |
| 2011/0061090 A1* | 3/2011 | Gillespie ........... | H04L 29/12311 726/3 |
| 2011/0302657 A1 | 12/2011 | Ikegami et al. | |
| 2012/0023546 A1* | 1/2012 | Kartha ................. | H04L 63/104 726/1 |
| 2012/0226932 A1 | 9/2012 | Adams et al. | |
| 2012/0240185 A1* | 9/2012 | Kapoor ............... | H04L 41/0866 726/1 |
| 2015/0033285 A1 | 1/2015 | Gao et al. | |
| 2016/0142283 A1* | 5/2016 | Bennett .................. | H04L 45/22 709/223 |

OTHER PUBLICATIONS

Xiang Wang et al. "Tualatin: Towards Network Security Service Provision in Cloud Datacenters", IEEE, 978-1-4799-3572-7, 2014, pp. 1-8.
Chiharu Morioka et al., "A Study on Policy Control Functions in Service Chaining Architecture", IEICE Technical Report, 2015, vol. 114, No. 477, 24 pages (with partial English Translation).
"Optimization of Network Security Measures", Internet: <URL:http://jp.fujitsu.com/family/Isken/activity/work-group/08/abstract/pdf/00_abstract.pdf>, Fujitsu Family Kai LS Kenkyu Iinkai, May 21, 2009, 13 pages (with partial English Translation).
Hideyuki Shimonishi, "Recent Activities on Network Functions Virtualization (NFV)", The Journal of the Institute of Electronics, Information and Communication Engineers, Mar. 1, 2015, vol. 98, No. 3, 24 pages (with partial English Translation).
Notice of Allowance dated May 29, 2018 in Japanese Patent Application No. 2017-503649 with English translation, 4 pages.
Extended European Search Report dated Aug. 6, 2018 in corresponding European Patent Application No. 16758891.2, 9 pages.
Anonymous: "Firewall Load Balancing: Web Switching to Optimize Firewall Performance", Internet Citation, Jun. 1999, XP002324621, 7 pages, Retrieved from the Internet: URL:http://www.openbase.co.kr/customer/pdsfiles/flb whitepaper.pdf [retrieved-on Apr. 14, 2005].
Office Action dated Sep. 29, 2019 in Chinese Patent Application No. 201680013029.0, with English-language translation, 21 pages.

\* cited by examiner

| SECURITY POINT | SECURITY MEASURE FUNCTION | SECURITY EVENT | ... |
|---|---|---|---|
| vFW | L3 TERMINATION | EVENT e1 | ... |
| | L4 TERMINATION | - | ... |
| vIPS | L3 TERMINATION | EVENT e2 | ... |
| | L4 TERMINATION | EVENT e3 | ... |
| vWAF | L7 TERMINATION | EVENT e4 | ... |
| ... | ... | ... | ... | ns
SECURITY MEASURE INVALIDATION PREVENTION DEVICE, SECURITY MEASURE INVALIDATION PREVENTION METHOD, AND SECURITY MEASURE INVALIDATION PREVENTION PROGRAM

FIELD

The present invention relates to a security measure invalidation prevention device, a security measure invalidation prevention method, and a security measure invalidation prevention program.

BACKGROUND

In recent years, various methods have been proposed against complicated and sophisticated cyber attacks. For example, security control architectures have been proposed that utilize a plurality of security instruments in cloud computing environments and software defined networks (SDNs).

An example of such security control architectures performs provisioning on a security network configuration preliminarily set according to applications of a server and dynamically adds a policy setting on the basis of security policies preliminarily set to security events and mapping information about control instruments. The security control architecture, thus, can increase security by dynamically change the security policies.

CITATION LIST

Non Patent Literature

Non Patent Literature 1: Xiang Wang, Zhi Liu, Jun Li, Baohua Yang, Yaxuan Qi, "Tualatin: Towards Network Security Service Provision in Cloud Datacenters", IEEE, 978-1-4799-3572-7/14/$31.00 2014

SUMMARY

Technical Problem

The conventional technique, however, has a problem in that a security measure is invalidated in some cases. For example, in the conventional technique, when the network configuration is dynamically changed, a method is absent that optimizes the security measure by dynamically following the change. When a packet does not pass through security equipment as a result of the network being dynamically changed, the security equipment cannot perform the security measure in the conventional technique. The conventional technique, thus, causes the security measure to be invalidated in some cases.

Solution to Problem

A security measure invalidation prevention device, includes: an acquisition unit that acquires invalidated security point information about an invalidated security point among security points each having a measure function performing a security measure on a node connected to a network, the invalidated security point having a measure function to be invalidated; a determination unit that determines whether a security event the measure function of the invalidated security point addresses is present on the basis of the invalidated security point information acquired by the acquisition unit; and an extraction unit that extracts a security point to which the measure function of the invalidated security point is able to be shifted when the determination unit determines that the security event is present.

Advantageous Effects of Invention

The invention has an advantageous effect of preventing security measures from being invalidated.

DESCRIPTION OF EMBODIMENTS

The following describes embodiments of a security measure invalidation prevention device, a security measure invalidation prevention method, and a security measure invalidation prevention program according to the present application in detail with reference to the accompanying drawings. The embodiments do not limit the security measure invalidation prevention device, the security measure invalidation prevention method, and the security measure invalidation prevention program according to the present application.

Embodiment

The following describes a structure of a security measure invalidation prevention system, a structure of a security measure invalidation prevention device, and a process flow of the security measure invalidation prevention device, according to an embodiment, in this order, and describes advantageous effects of the embodiment last.

[Structure of Security Measure Invalidation Prevention System]

Figure 1:
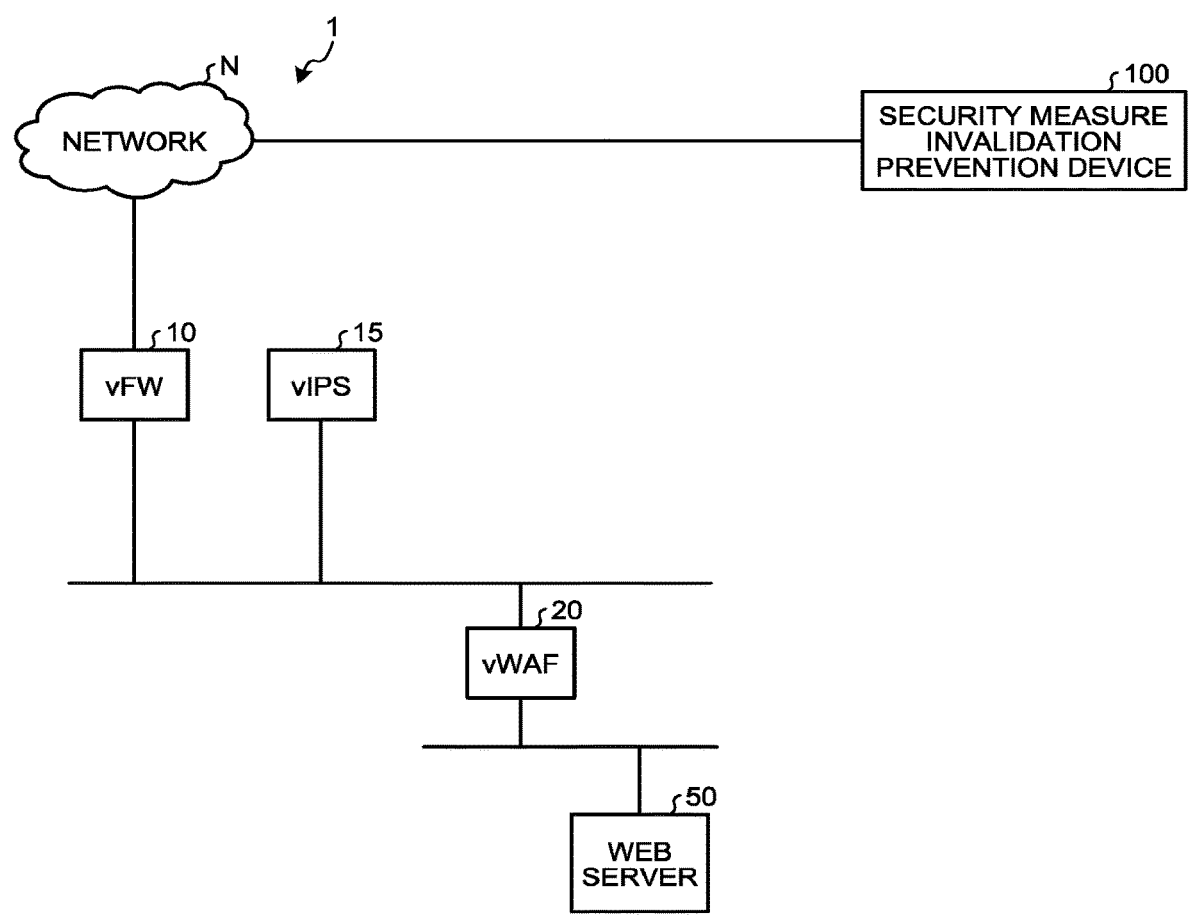
FIG. 1 is a diagram illustrating a structure of a security measure invalidation prevention system according to an embodiment.

With reference to FIG. 1, a structure of a security measure invalidation prevention system 1 according to the embodiment is described. FIG. 1 is a diagram illustrating the structure of the security measure invalidation prevention system 1 according to the embodiment. The security measure invalidation prevention system 1 includes a virtual firewall (vFW) 10, a virtual intrusion prevention system (vIPS) 15, a virtual web application firewall (vWAF) 20, a web server 50, and a security measure invalidation prevention device 100.

The vFW 10, the vIPS 15, the vWAF 20, the web server 50, and the security measure invalidation prevention device 100 communicate with one another via a network N. As an aspect of the network N, a communication network can be exemplified such as a local area network (LAN) or a virtual private network (VPN) regardless of a wired or wireless communication network. In the security measure invalidation prevention system 1, a packet flows in the vFW 10, the vIPS 15, the vWAF 20, and the web server 50 in this order, and reaches the security measure invalidation prevention device 100, via the network N.

In the example illustrated in FIG. 1, the vFW 10, the vIPS 15, the vWAF 20, the web server 50, and the security measure invalidation prevention device 100 are each singly included. They are not limited to be each singly included. They may be each included in any number. In the example illustrated in FIG. 1, the security measure invalidation prevention system 1 may further include other security equipment, for example.

The vFW 10 is a firewall that provides a security point protecting the web server 50 from external attacks. Specifically, the vFW 10 terminates communication having been determined to be unauthorized in accordance with a certain standard. The vFW 10 has, as security measure functions, a "layer 3 termination (hereinafter, described as the L3 termination)" that terminates unauthorized communication in a network layer, and a "layer 4 termination (hereinafter, described as the L4 termination)" that terminates unauthorized communication in a transport layer, for example. The vFW 10 is achieved by a virtual machine, for example.

The vIPS 15 is an invasion prevention system that provides a security point preventing the web server 50 from unauthorized invasion. Specifically, the vIPS 15 terminates communication when characteristic patterns included in a packet, such as a worm and a denial of service (DoS) attack, are detected. The vIPS 15 has the "L3 termination" and the "L4 termination" as the security measure functions, for example. The vIPS 15 is achieved by a virtual machine, for example.

The vWAF 20 is a web application firewall that provides a security point protecting the web server 50. Specifically, the vWAF 20 terminates communication that attacks a web application, such as SQL injection or cross site scripting. The vWAF 20 has, as the security measure function, a "layer 7 termination (hereinafter, described as the L7 termination)" that terminates unauthorized communication in an application layer, for example. The vWAF 20 is achieved by a virtual machine, for example.

The web server 50 is the target server protected in the security measure invalidation prevention system 1. Specifically, the security measures are performed on the web server 50 by the security measure functions included in the vFW 10, the vIPS 15, and the vWAF 20, resulting in the web server 50 receiving a packet having high reliability via the network N. The web server 50 is achieved by a virtual machine, for example.

The security measure invalidation prevention device 100 prevents the security measure functions of the respective security points from being invalidated. Specifically, the security measure invalidation prevention device 100 extracts a security point to which the security measure function of an invalidated security point can be shifted among the vFW 10, the vIPS 15, and the vWAF 20 each having the security measure function (an example of the measure function) performing the security measure on the web server 50 (an example of the node) connected to the network N, and outputs the extracted security point. For example, the security measure invalidation prevention device 100 outputs the security point to which the security measure function of the invalidated security point can be shifted, where the invalidated security point is isolated from a network path to the web server 50 and its security measure function is invalidated as a result of a network change performed by an external system (not illustrated). When no security point is present to which the security measure function of the invalidated security point can be shifted, the security measure invalidation prevention device 100 outputs an alert of a security hole being generated due to the occurrence of a security event in which the security point invalidated as a result of the network change cannot be shifted and no security measure is performed.

The security measure invalidation prevention device 100 in the security measure invalidation prevention system 1 outputs a shift-destination candidate for the invalidated security point as described above, thus, being able to prevent the security measure from being invalidated.

[Structure of Security Measure Invalidation Prevention Device]

Figures 2, 3:
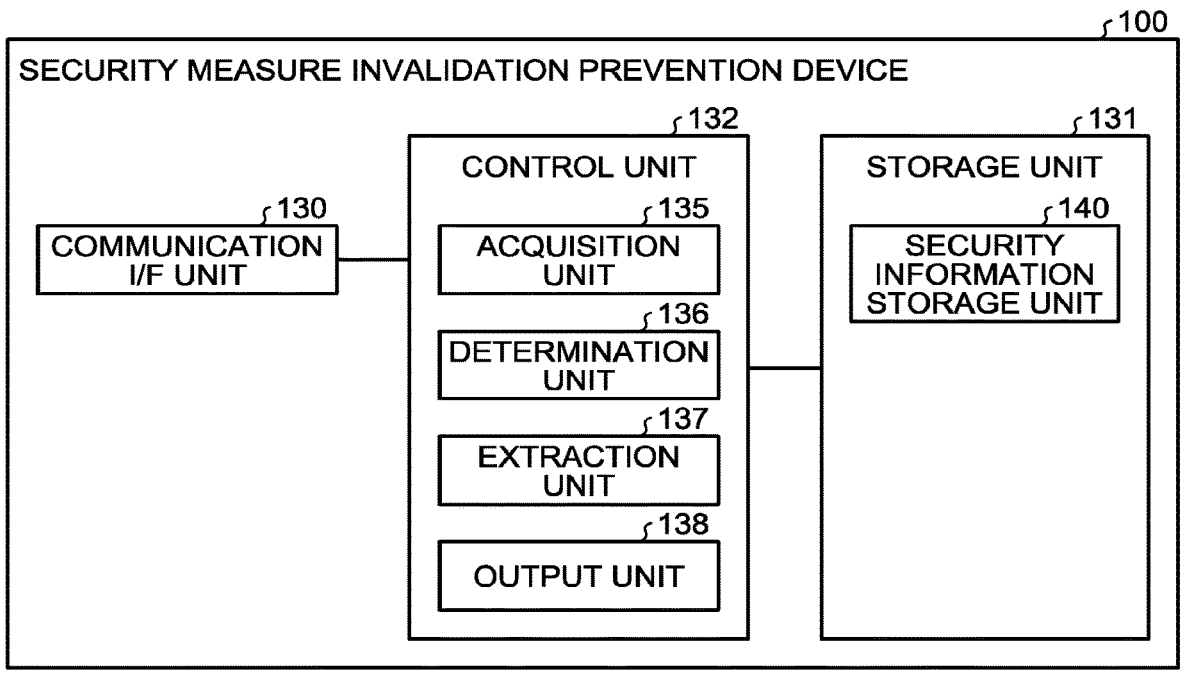
FIG. 2 is a diagram illustrating a structure of a security measure invalidation prevention device according to the embodiment.
FIG. 3 is a diagram illustrating an example of a security information storage unit of the security measure invalidation prevention device according to the embodiment.

The following describes the security measure invalidation prevention device 100 according to the embodiment. FIG. 2 is a diagram illustrating an example of the functional structure of the security measure invalidation prevention device. As illustrated in FIG. 2, the security measure invalidation prevention device 100 includes a communication I/F unit 130, a storage unit 131, and a control unit 132.

The communication I/F unit 130 is an interface that controls communication with other devices. The communication I/F unit 130 exchanges various types of information between itself and other devices and systems via the network N. The communication I/F unit 130 receives a packet from an external device via the network N, for example. The communication I/F unit 130 receives invalidated security point information about the invalidated security point among the security points each having the security measure function performing the security measure on the web server 50 connected to the network N, the invalidated security point having the security measure function to be invalidated. The communication I/F unit 130 receives security point information about the security point having the security measure function performing the security measure on the web server 50, security measure function information about the security measure function included in the security point, and security event information about the security event the security measure function addresses. For the communication I/F unit 130, a network interface card such as a LAN card can be adopted.

The storage unit 131 is a storage device such as a semiconductor memory element including a flash memory, a hard disk drive, or an optical disc. The storage unit 131 may be a data rewritable semiconductor memory such as a random access memory (RAM), a flash memory, or a non volatile static random access memory (NVSRAM).

The storage unit 131 stores therein an operating system (OS) executed by the control unit 132 and various programs that process received requests. The storage unit 131 stores therein various types of data used for the programs executed by the control unit 132. The storage unit 131 includes a security information storage unit 140, for example.

The security information storage unit 140 stores therein information about the security point having the security measure function performing the security measure on the node connected to the network N. Specifically, the security information storage unit 140 stores therein the security point information about the security point having the security measure function performing the security measure on the web server 50, the security measure function information (an example of the measure function information) about the security measure function included in the security point, and the security event information (an example of the event information) about the security event the security measure function addresses. The security information storage unit 140 stores therein, as the security point information, the information about the security point having the security measure function performing the security measure on the web server 50 on the network path to which the web server 50 is connected, for example. The security information storage unit 140 stores therein, as the security event information, information about a cyber attack the security measure function addresses. For example, the security information storage unit 140 stores therein the security event information in association with the security point and the security measure function. FIG. 3 illustrates an example of the security information storage unit 140 of the security measure invalidation prevention device 100 according to the embodiment. As illustrated in FIG. 3, the security information storage unit 140 includes items such as "security point", "security measure function", and "security event".

The item "security point" indicates a name identifying the security point having the security measure function performing the security measure of the node connected to the network. The item "security measure function" indicates a name of the security measure function included in the security point. For example, the item "security measure function" stores therein information arbitrarily defined for each security point or each network. The item "security event" indicates an event to be addressed with the security measure function of the security point. For example, the item "security event" stores therein an event causing the security measure function to perform the security measure on the event. For example, the item "security event" stores therein information arbitrarily defined for each security measure function.

FIG. 3 illustrates an example where the security point "vFW" includes the security measure functions "L3 termination" and "L4 termination". FIG. 3 illustrates an example where the security measure function "L3 termination" of the security point "vFW" addresses a security event "event e1". When the security event "event e1" occurs, the security point "vFW" performs the security measure function "L3 termination" to prevent the unauthorized communication. FIG. 3 illustrates an example where no security event is present the security measure function "L4 termination" of the security point "vFW" addresses.

FIG. 3 illustrates an example where the security point "vIPS" includes the security measure functions "L3 termi-nation" and "L4 termination". In the example, the security point "vIPS" has the same security measure functions as the security point "vFW". FIG. 3 illustrates an example where the security measure function "L3 termination" of the security point "vIPS" addresses a security event "event e2". FIG. 3 illustrates an example where the security measure function "L4 termination" of the security point "vIPS" addresses a security event "event e3".

FIG. 3 illustrates an example where the security point "vWAF" includes the security measure function "L7 termination". In the example, the security point "vWAF" does not have the same security measure functions as the security point "vIPS". FIG. 3 illustrates an example where the security measure function "L7 termination" of the security point "vWAF" addresses a security event "event e4".

The control unit 132 is a device that controls the security measure invalidation prevention device 100. For the control unit 132, an electronic circuit such as a central processing unit (CPU) or a micro processing unit (MPU), or an integrated circuit such as an application specific integrated circuit (ASIC) or a field programmable gate array (FPGA) can be adopted. The control unit 132 includes an internal memory for storing programs specifying various processing procedures and control data, and executes various types of processing based on the programs and the data. The control unit 132 functions as various processing units as a result of the operation of the various programs. The control unit 132 includes an acquisition unit 135, a determination unit 136, an extraction unit 137, and an output unit 138, for example.

The acquisition unit 135 acquires various types of information about the security point. Specifically, the acquisition unit 135 acquires the invalidated security point information about the invalidated security point among the security points each having the measure function performing the security measure on the node connected to the network, the invalidated security point having the security measure function to be invalidated. For example, the acquisition unit 135 acquires, as the invalidated security point information, information identifying the security point controlled by an external system performing the network change when the change is performed. In other words, the acquisition unit 135 acquires, as the invalidated security point information, information identifying the security point isolated from the network path as a result of the network change. For example, the acquisition unit 135 acquires the invalidated security point information from the external system or the invalidated security point.

The acquisition unit 135 acquires information about the security event to be addressed with the security measure function of each security point. Specifically, the acquisition unit 135 acquires the security point information about the security point having the security measure function performing the security measure on the node, the security measure function information about the security measure function included in the security point, and the security event information about the security event the security measure function addresses. The acquisition unit 135 acquires, as the security point information, the information about the security point having the security measure function performing the security measure on the web server 50 on the network path to which the web server 50 is connected, for example. The acquisition unit 135 acquires, as the security event information, the information about a cyber attack the security measure function addresses. As an aspect, the acquisition unit 135 acquires the latest security point information, security measure function information, and security event information from the external system or each security point.

The acquisition unit 135 acquires the security point information, the security measure function information, and the security event information by a polling method, for example. For another example, the acquisition unit 135 acquires, from each security point or the external system, the security point information, the security measure function information, and the security event information by a notification method in which the acquisition unit 135 receives a notification from each security point or the external system when each piece of information is changed. The acquisition unit 135 stores the acquired security point information, security measure function information, and security event information in the security information storage unit 140.

The determination unit 136 determines presence or absence of the security event. Specifically, the determination unit 136 determines whether the security event to be addressed with the security measure function of the invalidated security point is present on the basis of the invalidated security point information acquired by the acquisition unit 135. The determination unit 136 determines whether the security event to be addressed with the security measure function of the invalidated security point is present on the basis of the invalidated security point information acquired by the acquisition unit 135, and the security point information and the security measure function information that are stored in the security information storage unit 140, for example. For example, the determination unit 136 determines, for each security measure function, whether the security event to be addressed with the security measure function of the invalidated security point is present with reference to the security event information corresponding to the security measure function of the invalidated security point in the security event information stored in the security information storage unit 140.

The extraction unit 137 extracts a security point serving as a shift-destination candidate. Specifically, when the determination unit 136 determines that the security event is present, the extraction unit 137 extracts a security point to which the security measure function of the invalidated security point can be shifted. When the determination unit 136 determines that at least one security event is present, the extraction unit 137 extracts, for each security event, the security point to which the security measure function of the invalidated security point can be shifted out of the security points excluding the invalidated security point, for example. For example, the extraction unit 137 extracts, as a security point that can be a shift-destination, the security point to which the security measure function of the invalidated security point can be shifted out of the security points on the network path to which the web server 50 is connected.

The output unit 138 outputs the shift-destination candidate for security point. Specifically, the output unit 138 outputs, as the shift-destination candidate security point, the security point extracted by the extraction unit 137. The output unit 138 outputs, as the shift-destination candidate security point, the security point extracted by the extraction unit 137 for each security event, for example. For example, the output unit 138 outputs the invalidated security point in association with the shiftable security point.

When the determination unit 136 determines that the security event to be addressed with the security measure function of the invalidated security point is absent, the output unit 138 outputs the absence of the shifting target security event. For example, the output unit 138 outputs that "the shifting target security event is absent".

When the extraction unit 137 extracts no security point to which the security measure function of the invalidated security point can be shifted due to the absence of the shiftable security point, the output unit 138 outputs the absence of the shiftable security point. For example, the output unit 138 outputs that "the shiftable security point is absent" in association with the determination target security event. As another aspect, the output unit 138 outputs an alert of a security hole being generated due to the occurrence of a security event in which the security event cannot be shifted and that the security point invalidated as a result of the network change addresses, and no security measure is performed.

The following describes an example of the security measure invalidation prevention processing by the security measure invalidation prevention device 100 according to the embodiment with reference to FIGS. 4 to 9. In the example illustrated in FIGS. 4 to 9, the security measure invalidation prevention system 1 includes the vFW 10, the vIPS 15, the vWAF 20, the web server 50, and the security measure invalidation prevention device 100. In the following description, a case is assumed where a security attack is applied to the web server 50.

Figure 4:
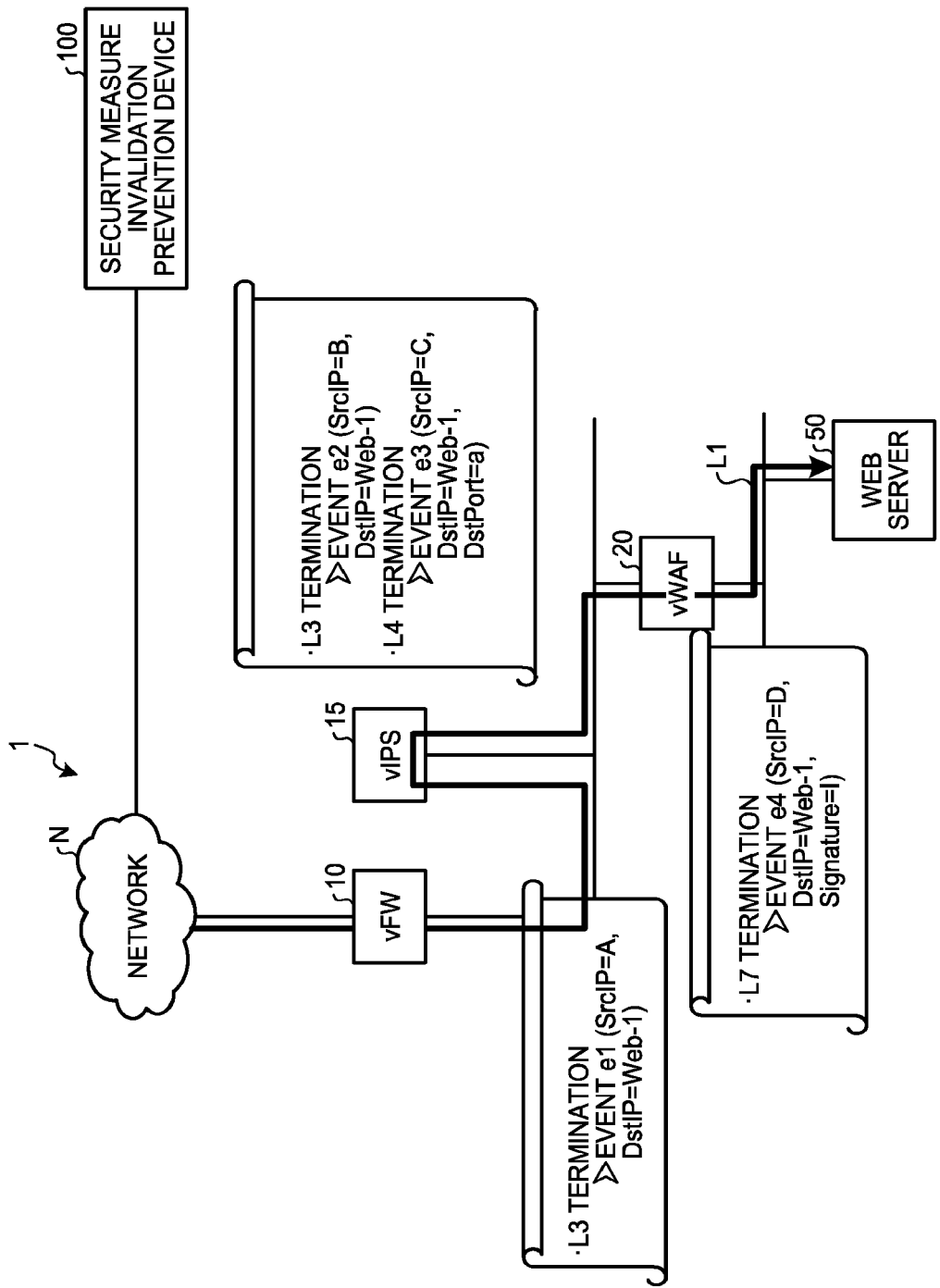
FIG. 4 is a diagram for explaining an example of processing before a network path change in the security measure invalidation prevention system according to the embodiment.

With reference to FIG. 4, the following describes a processing status in the security measure invalidation prevention system 1 before the network path is changed. FIG. 4 is a diagram for explaining an example of the processing in the security measure invalidation prevention system according to the embodiment before the network path is changed. FIG. 4 illustrates an exemplary security event where the security measure functions of the vFW 10, the vIPS 15, and the vWAF 20 address the security attack occurring on the network path from the network N to the web server 50. In the example illustrated in FIG. 4, a network path L1 is formed such that a packet flows from the network N to the vFW 10, the vIPS 15, the vWAF 20, and the web server 50 in this order.

As illustrated in FIG. 4, the L3 termination function of the vFW 10 addresses the security event "event e1". The L3 termination function of the vFW 10 saves "A" as a transmission source IP (SrcIP) of an attacker attacking the security event "event e1". The L3 termination function of the vFW 10 saves "Web-1" as an IP (DstIP) of a subject protected from the security event "event e1".

The L3 termination function of the vIPS 15 addresses the security event "event e2". The L3 termination function of the vIPS 15 saves "B" as the SrcIP of the security event "event e2". The L3 termination function of the vIPS 15 saves "Web-1" as the DstIP of the security event "event e2".

The L4 termination function of the vIPS 15 addresses the security event "event e3". The L4 termination function of the vIPS 15 saves "C" as the SrcIP of the security event "event e3". The L4 termination function of the vIPS 15 saves "Web-1" as the DstIP of the security event "event e3". The L4 termination function of the vIPS 15 saves "a" as a TCP port number (DstPort) of a subject protected from the security event "event e3".

The L7 termination function of the vWAF 20 addresses the security event "event e4". The L7 termination function of the vWAF 20 saves "D" as the SrcIP of the security event "event e4". The L7 termination function of the vWAF 20 saves "Web-1" as the DstIP of the security event "event e4". The L7 termination function of the vWAF 20 saves "I" as signature information (Signature) about the security event "event e4".

The vFW 10, the vIPS 15, and the vWAF 20 each perform security setting on the basis of the security event to be addressed with the security measure function of each security point.

The security measure invalidation prevention device 100 retains the security measure function of each security point and the information about the security event the security measure function addresses in association with the security point. The security measure invalidation prevention device 100 acquires, from each security point or the external system, the latest information about the security measure function of each security point and the security event the security measure function addresses, and stores therein the latest information, for example. For example, the security measure invalidation prevention device 100 acquires the latest information about the security point, the security measure function, and the security event by a polling method or a notification method.

Figure 5:
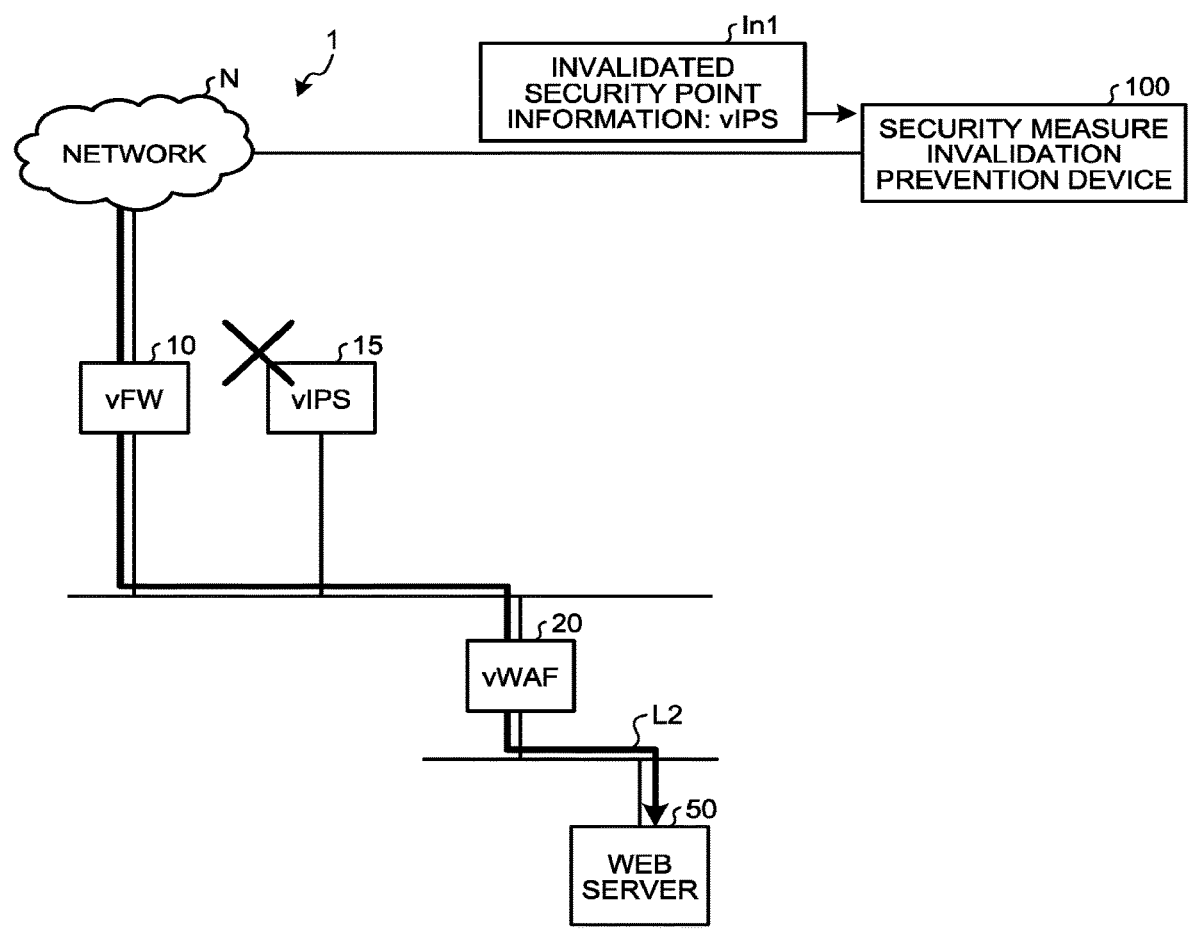
FIG. 5 is a diagram for explaining an example of acquisition processing in security measure invalidation prevention processing according to the embodiment.

It is assumed that a change of the network path L1 is performed by the external system (not illustrated). In this case, the security measure invalidation prevention device 100 acquires the information about the invalidated security point having the security measure function to be invalidated as a result of the change of the network path L1. This acquisition is described with reference to FIG. 5. FIG. 5 is a diagram for explaining an example of the acquisition processing in security measure invalidation prevention processing according to the embodiment. FIG. 5 illustrates an example where the network path is changed from the network path L1 illustrated in FIG. 4 to a network path L2. In this case, a packet flows from the network N to the vFW 10, the vWAF 20, and the web server 50 in this order on the network path L2. In other words, no packet passes through the vIPS 15 having been isolated from the network path as a result of the change from the network path L1 to the network L2. The vIPS 15, which is one of the vFW 10, the vIPS 15, and the vWAF 20 that protect the web server 50, is invalidated because no packet passes through the vIPS 15 and no security measure function is performed.

The security measure invalidation prevention device 100, thus, acquires the invalidated security point information about the vIPS 15, which is the invalidated security point among the vFW 10, the vIPS 15, and the vWAF 20 each having the security measure function performing the security measure on the web server 50 connected to the network N, the invalidated security point having the security measure function is invalidated. In the example illustrated in FIG. 5, the security measure invalidation prevention device 100 acquires "vIPS" as invalidated security point information In1. For example, the security measure invalidation prevention device 100 acquires the invalidated security point information In1 from the external system performing the network change or the invalidated security point vIPS 15.

Figure 6:
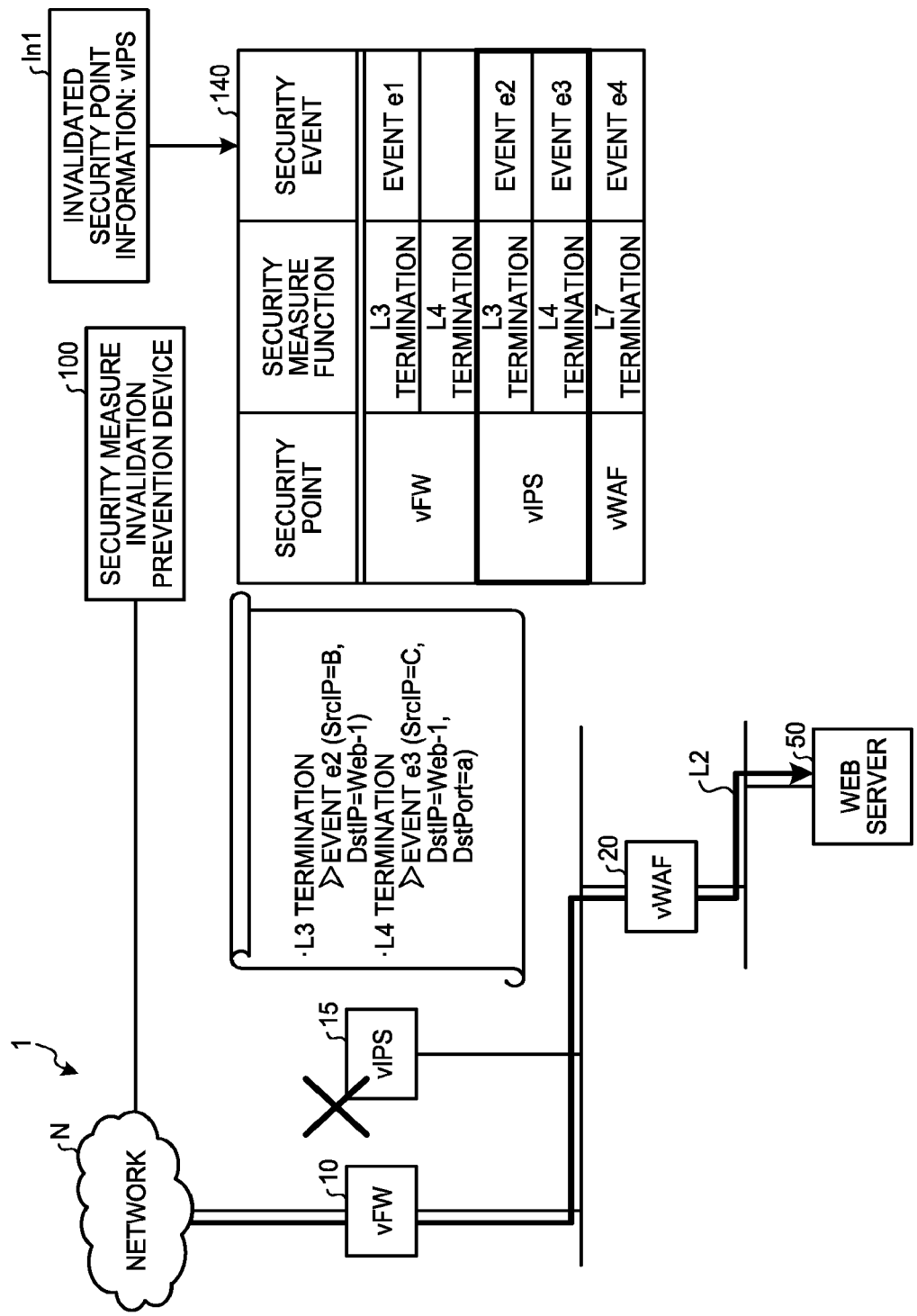
FIG. 6 is a diagram for explaining an example of determination processing in the security measure invalidation prevention processing according to the embodiment.

Thereafter, the security measure invalidation prevention device 100 checks current status between the security measure function of the invalidated security point and the security event. Specifically, the security measure invalidation prevention device 100 determines whether the security event to be addressed with the security measure function of the invalidated security point is present on the basis of the acquired invalidated security point information. This determination is described with reference to FIG. 6. FIG. 6 is a diagram for explaining an example of the determination processing in the security measure invalidation prevention processing according to the embodiment. In the example illustrated in FIG. 6, the security measure invalidation prevention device 100 refers to the security measure function of the security point "vIPS" and the security event that are stored in the security information storage unit 140 using "vIPS" of the invalidated security point information In1 as a search key. The security measure invalidation prevention device 100 determines that the "event e2" is present as the security event the security measure function "L3 termination" addresses. The security measure invalidation prevention device 100 also determines that the "event e3" is present as the security event the security measure function "L4 termination" addresses.

Figure 7:
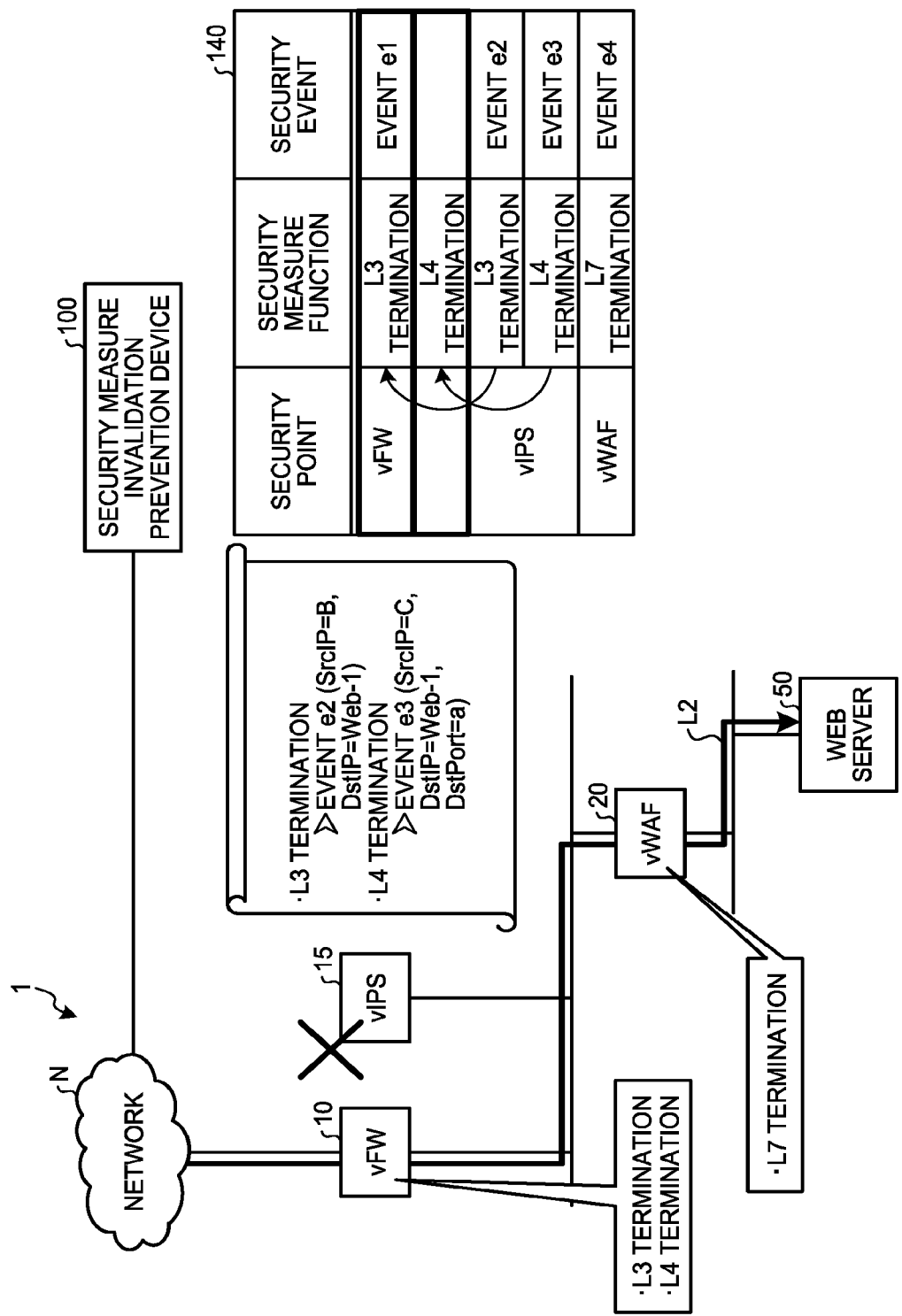
FIG. 7 is a diagram for explaining an example of extraction processing in the security measure invalidation prevention processing according to the embodiment.

Subsequently, the security measure invalidation prevention device 100 extracts a security point serving as the candidate for shifting the security measure function included in the invalidated security point. Specifically, when it is determined that the security event is present, the security measure invalidation prevention device 100 extracts a security point to which the security measure function of the invalidated security point can be shifted. This extraction is described with reference to FIG. 7. FIG. 7 is a diagram for explaining an example of the extraction processing in the security measure invalidation prevention processing according to the embodiment. In the example illustrated in FIG. 7, the security point "vFW" has the "L3 termination" and the "L4 termination", which are the same functions as the security measure functions "L3 termination" and "L4 termination" included in the invalidated security point "vIPS". The security point "vWAF", however, has only the security measure function "L7 termination" but does not have the same functions as the security measure functions "L3 termination" and "L4 termination" included in the invalidated security point "vIPS". The security measure invalidation prevention device 100, thus, extracts, as the shiftable security point, the security point "vFW", which has the same functions as the security measure functions "L3 termination" and "L4 termination" of the invalidated security point "vIPS".

Thereafter, the security measure invalidation prevention device 100 outputs the information about the security point to which the security measure function of the invalidated security point can be shifted. Specifically, the security measure invalidation prevention device 100 outputs the extracted security point as the shift-destination candidate security point. For example, the security measure invalidation prevention device 100 outputs the shift-destination candidate security point for each security event to be addressed with each security measure function of the invalidated security point.

Figure 8:
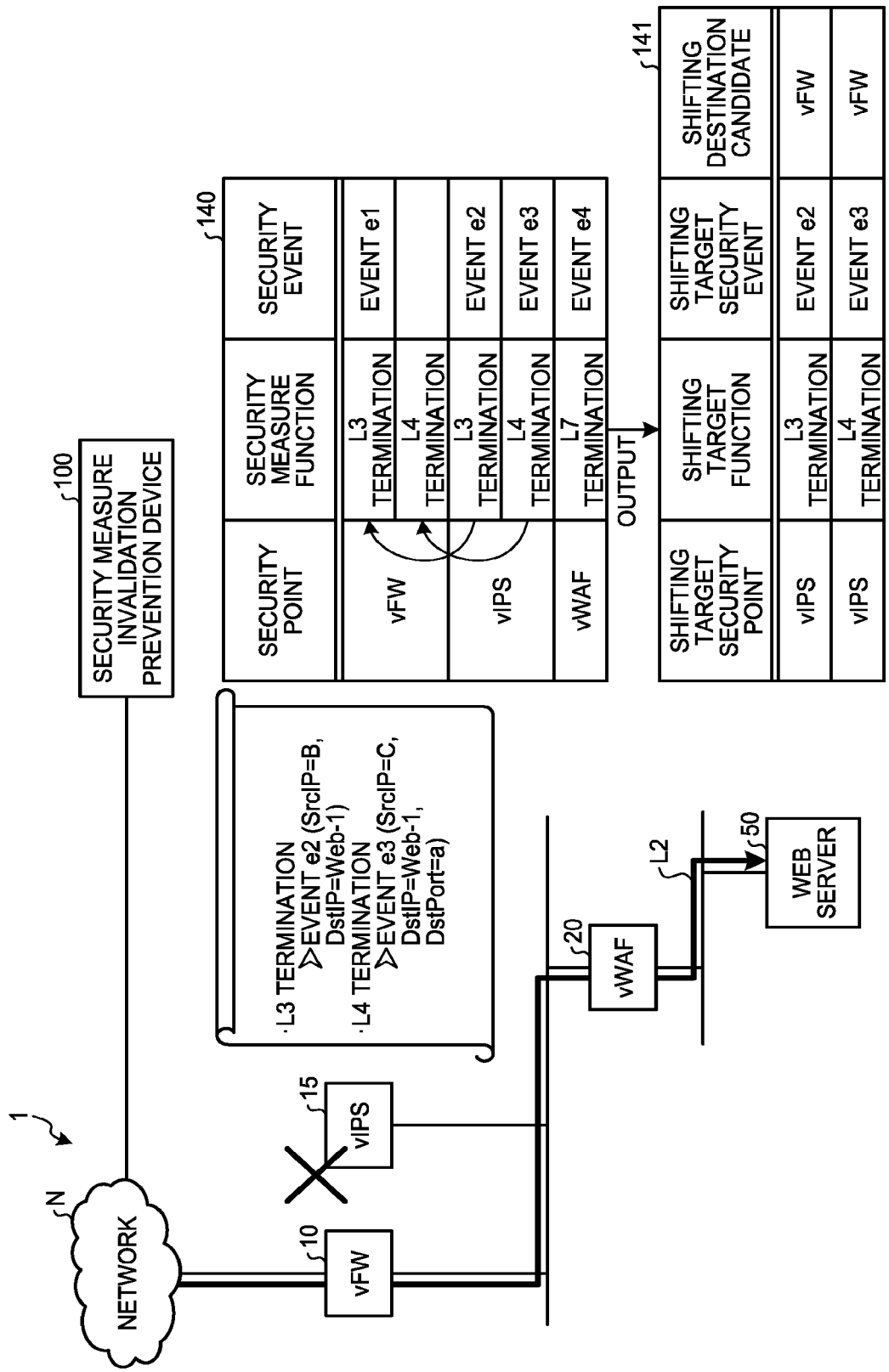
FIG. 8 is a diagram for explaining an example of output processing in the security measure invalidation prevention processing according to the embodiment.

This output is described with reference to FIG. 8. FIG. 8 is a diagram for explaining an example of the output processing in the security measure invalidation prevention processing according to the embodiment. In the example illustrated in FIG. 8, the security measure invalidation prevention device 100 outputs shifting information 141 indicating the security point to which the security measure function of the invalidated security point is shifted. As illustrated in FIG. 8, the shifting information 141 includes items such as "shifting target security point", "shifting target function", "shifting target security event" and "shift-destination candidate", for example. The item "shifting target security point" indicates the invalidated security point the security measure function of which is shifted to another security point. The item "shifting target function" indicates the security measure function to be shifted of the shifting target security point. The item "shifting target security event" indicates the security event to be shifted that is addressed with the security measure function of the shifting target security point. The item "shift-destination candidate" indicates the security point, serving as the shift destination, to which the security event to be addressed with the security measure function of the shifting target security point is shifted.

In the example illustrated in FIG. 8, the security measure invalidation prevention device 100 outputs "vFW" as the shift-destination candidate of the shifting target security event "event e2" the shifting target function "L3 termination" of the shifting target security point "vIPS" addresses. The security measure invalidation prevention device 100 also outputs "vFW" as the shift-destination candidate of the shifting target security event "event e3" the shifting target function "L4 termination" of the shifting target security point "vIPS" addresses.

Figure 9:
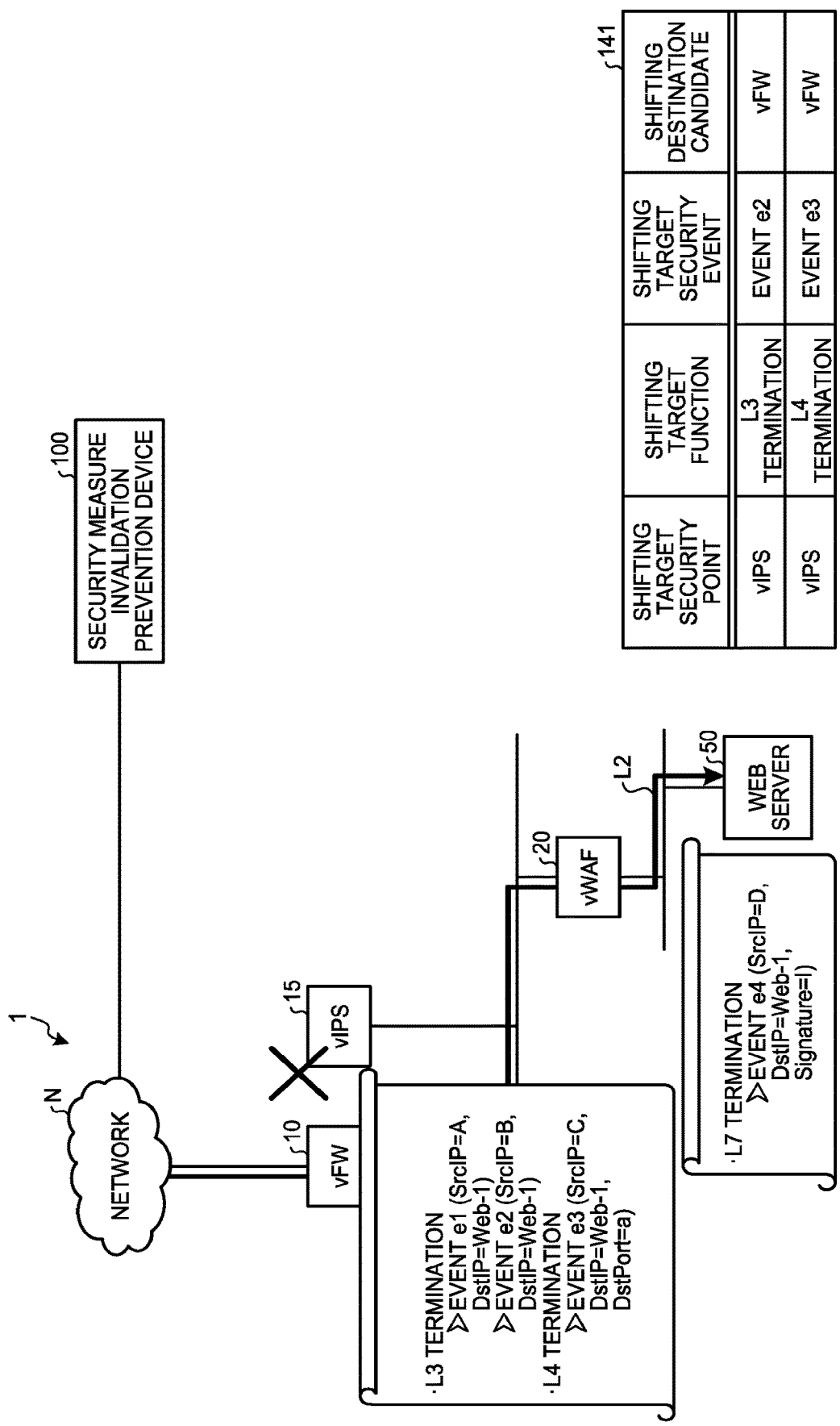
FIG. 9 is a diagram for explaining an example of processing after shifting of a security event in the security measure invalidation prevention processing according to the embodiment.

Thereafter, shifting processing is performed on the security event the measure function included in the invalidated security point addresses on the basis of the shifting information 141 about the shift-destination candidate output by the security measure invalidation prevention device 100. As for the shifting processing, the external system performs operation to change the setting of the security point on the basis of the shifting information 141 output by the security measure invalidation prevention device 100, for example. The following describes processing in relation to the shifting processing with reference to FIG. 9. FIG. 9 is a diagram for explaining an example of the processing after the shifting of the security event in the security measure invalidation prevention processing according to the embodiment. In the example illustrated in FIG. 9, the security measure function "L3 termination" of the vFW 10 addresses the security event "event e2" the security measure function "L3 termination" of the invalidated vIPS 15 addresses, in the security measure invalidation prevention system 1. The security measure function "L3 termination" of the vFW 10, thus, addresses the security event "event e2" in addition to the security event "event e1". The L3 termination function of the vFW 10 saves the SrcIP "B" and the DstIP "Web-1" of the security event e2 in addition to the SrcIP "A" and the DstIP "Web-1" of the security event e1.

The security measure function "L4 termination" of the vFW 10 addresses the security event "event e3" the security measure function "L4 termination" of the invalidated vIPS 15 addresses. The L4 termination function of the vFW 10 saves the SrcIP "C", the DstIP "Web-1", and the DstPort "a" of the security event e3.

The L7 termination function of the vWAF 20 continues to address the security event e4 after the change from the network path L1 to the network path L2. The L7 termination function of the vWAF 20, thus, continues to save the SrcIP "D", the DstIP "Web-1", and the Signature "I" of the security event e4.

As described above, the security measure invalidation prevention device 100 outputs the information about the security point to which the security event can be shifted that the security measure function of the invalidate security point addresses. As a result, the security measure invalidation prevention device 100 enables another security point to address the security event the security measure function of the invalidated security point addresses, thereby making it possible to prevent the security measure from being invalidated. For example, the security measure invalidation prevention device 100 can cause the external system to set the security point on the basis of the information about the shiftable security point, thereby making it possible to maintain the security level even when the invalidated security point is generated. The security measure invalidation prevention device 100 enables the network to be changed without diminishing the security level, thereby making it possible to manage the network in a flexible manner.

The external system may perform operation to cancel the network change on the basis of the shifting information 141, for example. For example, when no shiftable security point is present, the external system performs the operation to cancel the network change because the network change causes a security hole to be generated.

[Processing Procedure]

Figure 10:
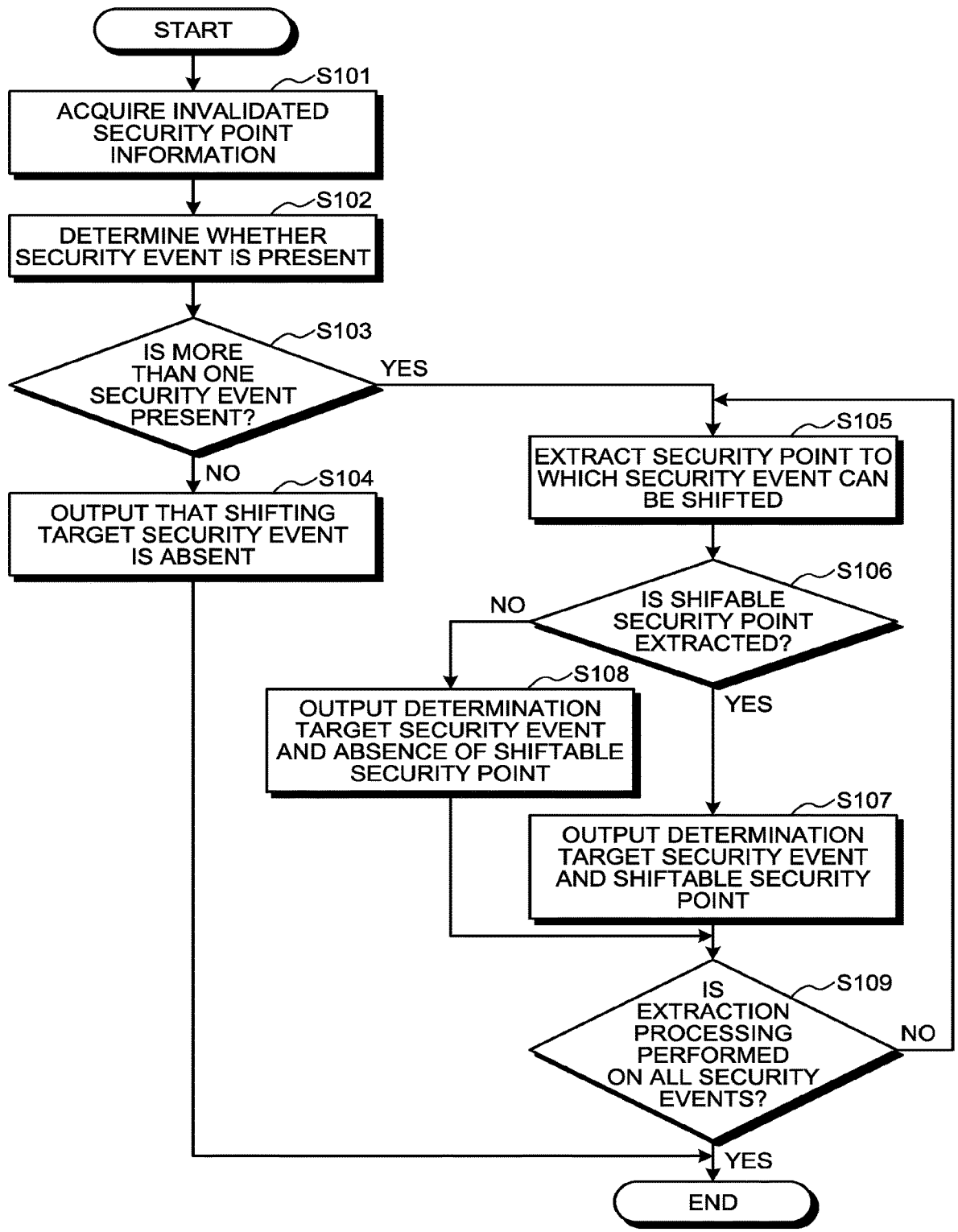
FIG. 10 is a flowchart illustrating a procedure of the security measure invalidation prevention processing by the security measure invalidation prevention device according to the embodiment.

The following describes a flow of the security measure invalidation prevention processing by the security measure invalidation prevention device 100 according to the embodiment with reference to FIG. 10. FIG. 10 is a flowchart illustrating the procedure of the security measure invalidation prevention processing by the security measure invalidation prevention device according to the embodiment.

In the example illustrated in FIG. 10, the security measure invalidation prevention device 100 starts the security measure invalidation prevention processing when the network path of the web server 50, which is the protection target, is changed by the external system, for example.

Specifically, the security measure invalidation prevention device 100 acquires the invalidated security point information about the invalidated security point among the security points each having the security measure function performing the security measure on the web server 50 connected to the network, the invalidated security point having the security measure function to be invalidated (step S101). For example, the security measure invalidation prevention device 100 acquires, from the external system or the invalidated security point as the invalidated security point information, the information identifying the security point isolated from the network path as a result of the network change.

The security measure invalidation prevention device 100 determines whether the security event to be addressed with the security measure function of the invalidated security point is present on the basis of the acquired invalidated security point information (step S102). For example, the security measure invalidation prevention device 100 determines whether the security event to be addressed with the security measure function of the invalidated security point is present on the basis of the acquired invalidated security point information, and the security point information, the security measure function information, and the security event information that are stored in the security information storage unit 140.

If it is determined that no security event is present (No at step S103), the security measure invalidation prevention device 100 outputs that "the shifting target security point is absent" (step S104), and ends the security measure invalidation prevention processing.

If it is determined that one or more security events are present (Yes at step S103), the security measure invalidation prevention device 100 extracts a security point to which the security measure function of the invalidated security point can be shifted (step S105). For example, the security measure invalidation prevention device 100 extracts, for each security event, the security point to which the security measure function of the invalidated security point can be shifted out of the security points excluding the invalidated security point.

If the shiftable security point is extracted (Yes at S106), the security measure invalidation prevention device 100 outputs the shiftable security point as the shift-destination candidate security point in association with the determination target security point (step S107).

If the security point to which the security measure function of the invalidated security point can be shifted is absent and, thus, the shiftable security point is not extracted (No at S106), the security measure invalidation prevention device 100 outputs that "the shiftable security point is absent" in association with the determination target security point (step S108). For example, the security measure invalidation prevention device 100 may output an alert of a security hole being generated due to the occurrence of a security event in which the security point invalidated as a result of the network change cannot be shifted and no security measure is performed.

The security measure invalidation prevention device 100 determines whether the extraction processing is performed on all of the security events the security measure function of the invalidated security point addresses (step S109). If it is determined that the extraction processing is not performed on all of the security events the security measure function of the invalidated security point addresses (No at step S109), the security measure invalidation prevention device 100 repeats the processing from step S105 to step S109 on the security events on which the extraction processing is not yet performed. If it is determined that the extraction processing is performed on all of the security events the security measure function of the invalidated security point addresses (Yes at step S109), the security measure invalidation prevention device 100 ends the security measure invalidation prevention processing.

Modifications

In the embodiment described above, when the determination unit 136 determines that the security event is present, the security measure invalidation prevention device 100 extracts a security point to which the security measure function of the invalidated security point can be shifted.

When a plurality of security points are present to which the security measure function of the invalidated security point can be shifted, the security measure invalidation prevention device 100 may extract the shiftable security point in accordance with various selection standards. Specifically, when a plurality of security points are present to which the security measure function of the invalidated security point can be shifted, the security measure invalidation prevention device 100 extracts a single optimum security point out of the multiple shiftable security points in accordance with various selection algorithms. The extraction unit 137 of the security measure invalidation prevention device 100 extracts the security point closest to an attack source attacking the web server 50 out of the security points to which the security measure function of the invalidated security point can be shifted, for example. For example, the extraction unit 137 extracts the security point closest to an attack source attacking the web server 50 out of the multiple shiftable security points excluding the invalidated security point on the basis of the security event the security measure function of the invalidated security point addresses.

As described above, the extraction unit 137 of the security measure invalidation prevention device 100 extracts the security point closest to an attack source attacking the web server 50 out of the security points to which the security measure function of the invalidated security point can be shifted.

The security measure invalidation prevention device 100, thus, can extract the security point where the security event is most efficiently addressed out of the multiple shiftable security points, thereby making it possible to enhance the effect in shifting the invalidated security point.

In the embodiment, the vFW 10, the vIPS 15, the vWAF 20, and the web server 50 are virtual resources achieved by virtual machines. They, however, may be physical security equipment. The security measure invalidation prevention device 100 can prevent the security measures from being invalidated even when the node to be protected is protected by the physical security points.

In the embodiment, the protection target node is only the web server 50. A plurality of protection target nodes may be present. In this case, the security measure invalidation prevention device 100 stores, for each protection target node, the security point information, the security measure function information, and the security event information for protecting the node in the security information storage unit 140, and manages the stored information. The security measure invalidation prevention device 100 can prevent the security measures from being invalidated even when a plurality of protection target nodes are present, thereby making it possible to maintain the security level.

Effects of Embodiment

The security measure invalidation prevention device 100 according to the embodiment includes: the acquisition unit 135 that acquires the invalidated security point information about the invalidated security point among the security points each having the security measure function performing the security measure on the web server 50 connected to the network, the invalidated security point having the security measure function to be invalidated; the determination unit 136 that determines whether the security event to be addressed with the security measure function of the invalidated security point is present on the basis of the invalidated security point information acquired by the acquisition unit 135; the extraction unit 137 that extracts a security point to which the security measure function of the invalidated security point can be shifted when the determination unit 136 determines that the security event is present; and the output unit 138 that outputs, as the shift-destination candidate security point, the security point extracted by the extraction unit 137.

The security measure invalidation prevention device 100 according to the embodiment further includes: the security information storage unit 140 that stores therein the security point information about the security point having the security measure function performing the security measure on the web server 50; the security measure function information about the security measure function included in the security point; and the security event information about the security event the security measure function addresses. In the security measure invalidation prevention device 100 according to the embodiment, the determination unit 136 determines whether the security event to be addressed with the security measure function of the invalidated security point is present on the basis of the invalidated security point information acquired by the acquisition unit 135, the security point information, the security measure function information, and the security event information that are stored in the security information storage unit 140.

In the security measure invalidation prevention device 100 according to the embodiment, the security information storage unit 140 stores therein, as the security point information, the information about the security point having the security measure function performing the security measure on the web server 50 on the network path to which the web server 50 is connected, and stores therein, as the security event information, the information about a cyber attack to be addressed with the security measure function.

In the security measure invalidation prevention device 100 according to the embodiment, the determination unit 136 determines, for each security measure function, whether the security event to be addressed with the security measure function of the invalidated security point is present with reference to the security event information corresponding to the security measure function of the invalidated security point in the security event information stored in the security information storage unit 140. In the security measure invalidation prevention device 100 according to the embodiment, when the determination unit 136 determines that at least one security event is present, the extraction unit 137 extracts, for each security event, the security point to which the measure function of the invalidated security point can be shifted out of the security points excluding the invalidated security point. In the security measure invalidation prevention device 100 according to the embodiment, the output unit 138 outputs, as the shift-destination candidate security point, the security point extracted by the extraction unit 137 for each security event.

In the security measure invalidation prevention device 100 according to the embodiment, the extraction unit 137 extracts, as the shiftable security point, the security point to which the security measure function of the invalidated security point can be shifted out of the security points on the network path to which the web server 50 is connected.

The security measure invalidation prevention device 100 according to the embodiment, thus, outputs the information about the security point to which the security event the security measure function of the invalidated security point addresses can be shifted. As a result, the security measure invalidation prevention device 100 enables another security point to address the security event the security measure function of the invalidated security point addresses, thereby making it possible to avoid the existing security effect brought by the security measure from being invalidated. For example, the security measure invalidation prevention device 100 can cause the external system to set the security point on the basis of the information about the shiftable security point, thereby making it possible to maintain the security level even when the invalidated security point is generated.

In the security measure invalidation prevention device 100 according to the embodiment, the extraction unit 137 extracts the security point closest to an attack source attacking the web server 50 out of the security points to which the security measure function of the invalidated security point can be shifted.

The security measure invalidation prevention device 100 according to the embodiment, thus, can extract the security point where the security event is most efficiently addressed out of the multiple shiftable security points, thereby making it possible to enhance the effect in shifting the invalidated security point.

Another Embodiment

In the embodiment described above, the security measure invalidation prevention device 100 outputs the shifting information 141 about the shift-destination candidate security point after extracting the shift-destination candidate security point. In the embodiment, the shifting processing is performed by the external system that performs operation to change the setting of the security point on the basis of the shifting information 141 output by the security measure invalidation prevention device 100. The invention is not limited to the embodiment. For example, the security measure invalidation prevention device may automatically perform the shifting to the extracted security point after extracting the shift-destination candidate security point.

The following describes another embodiment in which a security measure invalidation prevention device 100A automatically performs the shifting to the extracted security point after extracting the shift-destination candidate security point. Descriptions of the same structure and processing as those in the embodiment described above are omitted.

Figure 11:
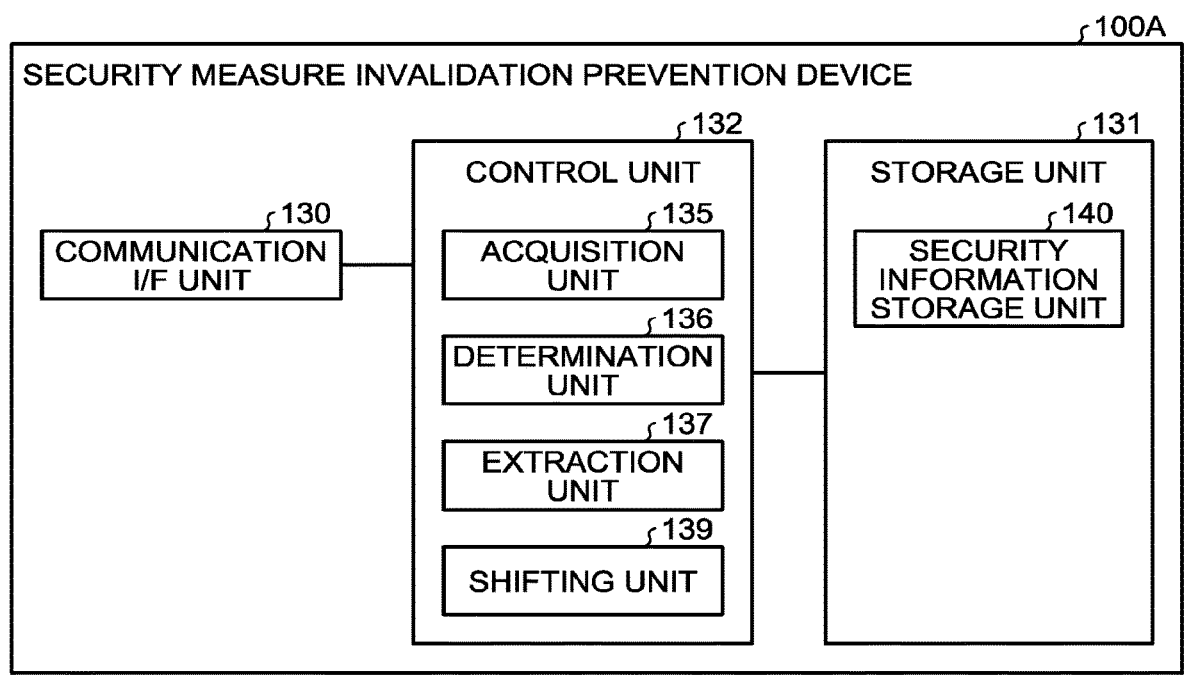
FIG. 11 is a diagram illustrating a structure of a security measure invalidation prevention device according to another embodiment.

FIG. 11 is a diagram illustrating a structure of the security measure invalidation prevention device according to the other embodiment. As illustrated in FIG. 11, the security measure invalidation prevention device 100A according to the other embodiment differs from the security measure invalidation prevention device 100 illustrated in FIG. 2 in that the security measure invalidation prevention device 100A does not include the output unit 138 but includes a shifting unit 139.

The shifting unit 139 shifts the security event to be addressed with the security measure function of the invalidated security point such that the security event can be addressed by the security point extracted by the extraction unit 137. Specifically, when the extraction unit 137 extracts a security point, the shifting unit 139 shifts the security event to be addressed with the security measure function of the invalidated security point such that the security event can be addressed by the extracted security point.

For example, in the shifting processing, the security measure invalidation prevention device 100A performs operation to change the setting of the extracted security point. The following describes the operation with reference to the examples illustrated in FIGS. 7 and 9. As exemplarily illustrated in FIG. 7, the security measure invalidation prevention device 100A extracts, as the shiftable security point, the security point "vFW", which has the same functions as the security measure functions "L3 termination" and "L4 termination" of the invalidated security point "vIPS".

In this case, as exemplarily illustrated in FIG. 9, the security measure invalidation prevention device 100A performs the shifting processing such that the security measure function "L3 termination" of the vFW 10 can address the security event "event e2" the security measure function "L3 termination" of the invalidated vIPS 15 addresses, in addition to the security event "event e1". The security measure invalidation prevention device 100A, thus, causes the L3 termination function of the vFW 10 to save the SrcIP "B" and the DstIP "Web-1" of the security event e2 in addition to the SrcIP "A" and the DstIP "Web-1" of the security event e1.

The security measure invalidation prevention device 100A performs the shifting processing such that the security measure function "L4 termination" of the vFW 10 can address the security event "event e3" the security measure function "L4 termination" of the invalidated vIPS 15 addresses. The security measure invalidation prevention device 100A, thus, causes the L4 termination function of the vFW 10 to save the SrcIP "C", the DstIP "Web-1", and the DstPort "a" of the security event e3.

When a plurality of security points are present to which the security measure function of the invalidated security point can be shifted, the security measure invalidation prevention device 100A may extract the shiftable security point in accordance with various selection standards in the same manner as described above. The extraction unit 137 of the security measure invalidation prevention device 100A extracts the security point closest to an attack source attacking the web server 50 out of the security points to which the security measure function of the invalidated security point can be shifted, for example. In this case, the shifting unit 139 of the security measure invalidation prevention device 100A performs control such that the shifting is performed on the security point closest to the attack source.

As described above, the security measure invalidation prevention device 100A according to the other embodiment shifts the security event to be addressed with the security measure function of the invalidated security such that the security event can be addressed by the security point extracted by the extraction unit 137, thereby making it possible to automatically shifting the security event the security measure function of the invalidated security point addresses to another security point to cause the other security point to address the security event.

While the embodiments of the present invention have been described, the embodiments have been presented by way of examples only, and are not intended to limit the scope of the invention. The embodiments described herein may be implemented in other various forms. Furthermore, various omissions, substitutions, and changes of the embodiments described herein may be made without departing from the spirit of the invention. The accompanying claims and their equivalents are intended to cover the embodiments and the modifications as falling within the scope and spirit of the invention.

In the embodiments, the components of the respective devices illustrated in the drawings are functionally conceptual ones, and are not always required to be the same as those physically configured as illustrated in the drawings. That is, specific forms of distributions and integrations of the respective devices (e.g., the form illustrated in FIG. 2) are not limited to those illustrated in the drawings. All or a part of the devices can be configured to be functionally or physically distributed or integrated in arbitrary units in accordance with various loads, the usage states, and the like. For example, the determination unit 136 and the extraction unit 137 may be integrated with each other as a single unit. For another example, the acquisition unit 135 may be separated into an acquisition unit that acquires the invalidated security point information, and another acquisition unit that acquires security point information.

All or part of the processing functions performed by the respective devices may be implemented by a CPU and a program analyzed and executed by the CPU, or may be implemented as hardware by wired logics.

In the processes described in the embodiments described above, all or a part of the processes described to be automatically performed can also be manually performed. Alternatively, all or a part of the processes described to be manually performed can also be automatically performed by known methods.

[Program]

A Program may be produced in which the processing performed by the security measure invalidation prevention devices 100, and 100A according to the embodiments is described in a computer executable language. In this case, the same effects as those of the embodiments can be achieved by a computer executing the program. The program may be recorded in a computer readable recording medium, and the same processing as that of the embodiments may be achieved by a computer reading and executing the program recorded in the recording medium. The following describes an example of a computer that executes a security measure invalidation prevention program to achieve the same functions as those of the security measure invalidation prevention devices 100 and 100A.

Figure 12:
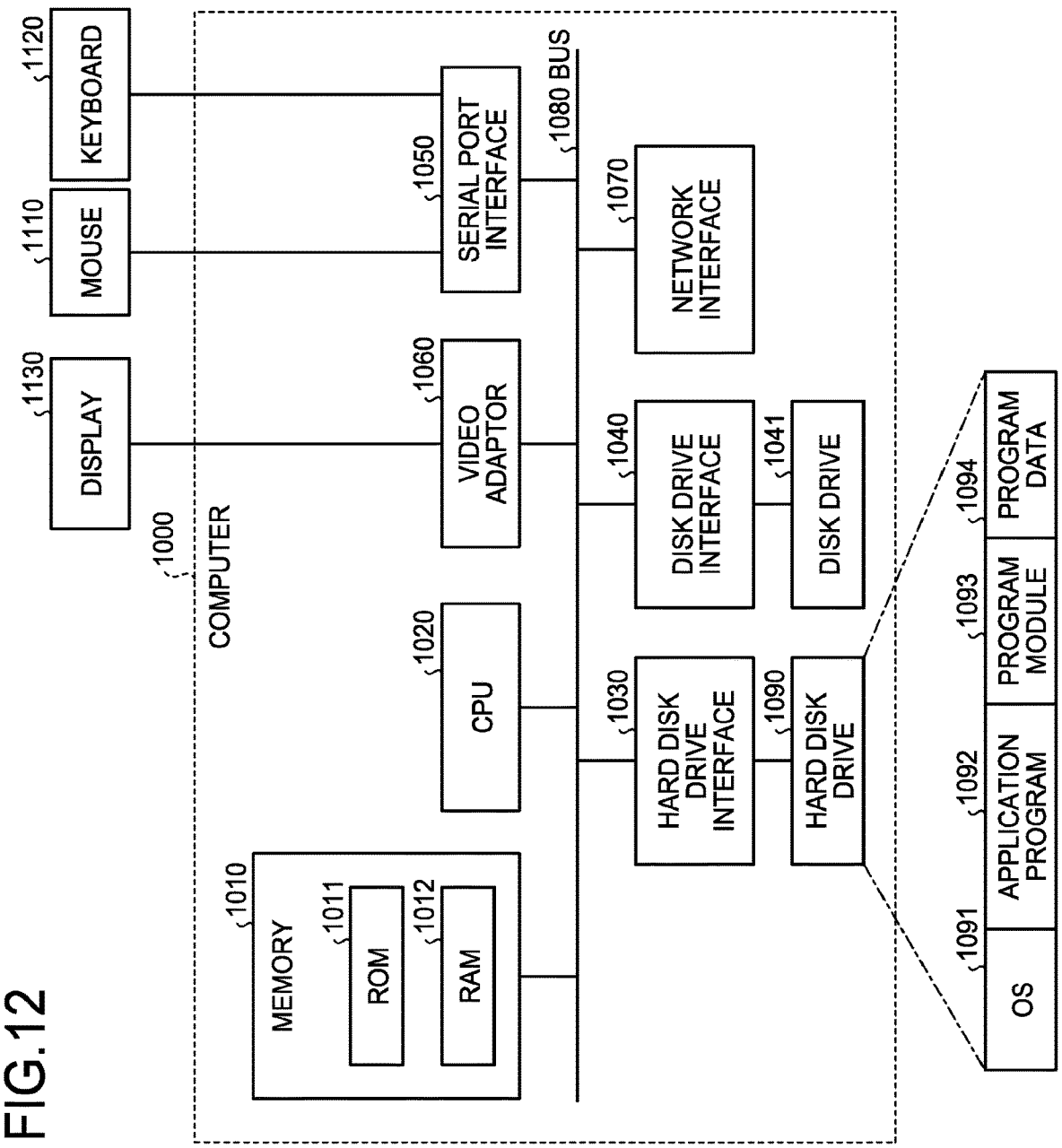
FIG. 12 is a diagram illustrating a computer executing a security measure invalidation prevention program.

FIG. 12 is a diagram illustrating a computer executing the security measure invalidation prevention program. As illustrated in FIG. 12, a computer 1000 includes a memory 1010, a CPU 1020, a hard disk drive interface 1030, a disk drive interface 1040, a serial port interface 1050, a video adaptor 1060, and a network interface 1070, for example. Those units are coupled with a bus 1080.

The memory 1010 includes a read only memory (ROM) 1011 and a RAM 1012. The ROM 1011 stores therein a boot program such as a basic input output system (BIOS), for example. The hard disk drive interface 1030 is connected to a hard disk drive 1090. The disk drive interface 1040 is connected to a disk drive 1041. A removable storage medium such as a magnetic disk or an optical disc is inserted in the disk drive 1041. To the serial port interface 1050, a mouse 1110 and a keyboard 1120 are connected, for example. To the video adaptor 1060, a display 1130 is connected, for example.

As illustrated in FIG. 12, the hard disk drive 1090 stores therein an OS 1091, an application program 1092, a program module 1093, and program data 1094, for example. The respective tables described in the embodiments are stored in the hard disk drive 1090 or the memory 1010, for example.

The security measure invalidation prevention program is stored in the hard disk drive 1090 as a program module in which commands executed by the computer 1000 are described, for example. Specifically, the program module 1093 in which the respective processes performed by the security measure invalidation prevention devices 100 and 100A described in the embodiments are described is stored in the hard disk drive 1090.

Data used for the information processing by the security measure invalidation prevention program is stored, as program data, in the hard disk drive 1090, for example. The CPU 1020 reads the program module 1093 and the program data 1094 that are stored in the hard disk drive 1090, into the RAM 1012 as the situation demands, and executes the respective steps described above.

The program module 1093 and the program data 1094 according to the security measure invalidation prevention program are not limited to being stored in the hard disk drive 1090. For example, they may be stored in a removable storage medium and read by the CPU 1020 via the disk drive 1041, for example. The program module 1093 and the program data 1094 according to the security measure invalidation prevention program may be stored in another computer coupled with a network such as a LAN or a wide area network (WAN), and read by the CPU 1020 via the network interface 1070.

REFERENCE SIGNS LIST

1 Security measure invalidation prevention system
100, 100A Security measure invalidation prevention device
135 Acquisition unit
136 Determination unit
137 Extraction unit
138 Output unit
139 Shifting unit
140 Security information storage unit

The invention claimed is:

1. A security measure invalidation prevention device, comprising:
   an electronic memory; and
   a processor coupled to the electronic memory and configured to acquire invalidated security point information about an invalidated security point among security points each having a measure function performing a security measure on a node connected to a network, the invalidated security point being bypassed in an updated network path as packets are routed from source to destination in order to invalidate a measure function thereof;

determine whether a security event that the measure function of the invalidated security point addresses is present based on the invalidated security point information acquired;

identify a security point to which the measure function of the invalidated security point is able to be shifted when presence of the security event is determined; and issue an alert in a case that no security point to which the measure function of the invalidated security point is able to be shifted is identified, wherein when there is no security point to which the measure function of the invalidated security point can be shifted, communication through the invalidated security point continues without bypassing the invalidated security point and without performing the measure function of the invalidated security point and an alarm is outputted.

2. The security measure invalidation prevention device according to claim 1, wherein the processor is further configured to output, as a shift-destination candidate security point, the security point identified.

3. The security measure invalidation prevention device according to claim 1, wherein the processor is further configured to shift the security event to be addressed with the measure function of the invalidated security the security point identified.

4. The security measure invalidation prevention device according to claim 1, wherein the electronic memory stores therein security point information about the security point having the measure function performing the security measure on the node, measure function information about the measure function included in the security point, and event information about the security event the measure function addresses, and the processor determines whether the security event to be addressed with the measure function of the invalidated security point is present on the basis of the invalidated security point information acquired, the security point information, the measure function information, and the event information that are stored in the electronic memory.

5. The security measure invalidation prevention device according to claim 4, wherein the electronic memory stores therein, as the security pointing information, information about the security point having the measure function performing the security measure on the node on a network path to which the node is connected, and, as the event information, information about a cyber attack to be addressed with the measure function.

6. The security measure invalidation prevention device according to claim 4, wherein the processor determines, for each measure function, whether the security event to be addressed with the measure function of the invalidated security point is present with reference to the event information corresponding to the measure function of the invalidated security point in the event information stored in the electronic memory, and the processor identifies, for each security event, the security point to which the measure function of the invalidated security point is able to be shifted out of the security points excluding the invalidated security point, when the processor determines that at least one security event is present.

7. The security measure invalidation prevention device according to claim 1, wherein the processor identifies the security point to which the measure function of the invalidated security point is able to be shifted out of the security points on a network path to which the node is connected.

8. The security measure invalidation prevention device according to claim 1, wherein the processor identifies a security point closest to an attack source attacking the node out of the security points to which the measure function of the invalidated security point is able to be shifted.

9. The security measure invalidation prevention device according to claim 1, wherein the security points include:
a fire wall security point that terminates unauthorized communications in at least one of a network layer and a transport layer,
an intrusion prevention security point that terminates communications that correspond to a predetermined pattern, and
a web application firewall that terminates unauthorized communications in an application layer.

10. The security measure invalidation prevention device according to claim 9, wherein the invalidated security point is the intrusion prevention security point, and the measure function of the intrusion prevention security point is shifted to one of the fire wall and the web application firewall.

11. A security measure invalidation prevention method performed by a security measure invalidation prevention device, the security measure invalidation prevention method comprising:

acquiring invalidated security point information about an invalidated security point among security points each having a measure function performing a security measure on a node connected to a network, the invalidated security point being bypassed by an updated network path as packets are routed from source to destination in order to invalidate a measure function thereof;

determining whether a security event to be addressed with the measure function of the invalidated security point is present based on the invalidated security point information acquired at the acquiring;

identifying a security point to which the measure function of the invalidated security point is able to be shifted when presence of the security event is determined; and issuing an alert in a case that no security point to which the measure function of the invalidated security point is able to be shifted is identified, wherein when there is no security point to which the measure function of the invalidated security point can be shifted, communication through the invalidated security point continues without bypassing the invalidated security point and without performing the measure function of the invalidated security point and an alarm is outputted.

12. The security measure invalidation prevention method according to claim 11, further comprising outputting, as a shift-destination candidate security point, the security point identified.

13. The security measure invalidation prevention method according to claim 11, further comprising shifting the security event to be addressed with the measure function of the invalidated security point to the security point identified.

14. A non-transitory computer-readable recording medium having stored a security measure invalidation prevention program that, when executed by a processor, causes the processor to perform a method comprising:

acquiring invalidated security point information about an invalidated security point among security points each having a measure function performing a security measure on a node connected to a network, the invalidated security point being bypassed by an updated network path as packets are routed from source to destination in order to invalidate a measure function thereof;

determining whether a security event to be addressed with the measure function of the invalidated security point is present based on the invalidated security point information acquired at the acquiring;

identifying a security point to which the measure function of the invalidated security point is able to be shifted when presence of the security event is determined; and issuing an alert in a case that no security point to which the measure function of the invalidated security point is able to be shifted is identified, wherein when there is no security point to which the measure function of the invalidated security point can be shifted, communication through the invalidated security point continues without bypassing the invalidated security point and without performing the measure function of the invalidated security point and an alarm is outputted.

15. The non-transitory computer-readable recording medium according to claim 14, further comprising outputting, as a shift-destination candidate security point serving, the security point identified.

16. The non-transitory computer-readable recording medium according to claim 14, further comprising shifting the security event to be addressed with the measure function of the invalidated security point to the security point identified.

* * * * *